United States Patent
Düringer

(10) Patent No.: US 7,549,915 B2
(45) Date of Patent: Jun. 23, 2009

(54) METHOD OF AND APPARATUS FOR THE CONTROLLED CLOSURE OF AT LEAST ONE CLIP AROUND A FILLING MATERIAL-FREE PLAIT PORTION BETWEEN TWO FILLING MATERIAL PORTIONS ENCLOSED WITH A CASING

(75) Inventor: Carsten Düringer, Friedrichsdorf (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/048,807

(22) Filed: Mar. 14, 2008

(65) Prior Publication Data

US 2008/0227377 A1  Sep. 18, 2008

(30) Foreign Application Priority Data

Mar. 16, 2007  (DE) ................ 10 2007 012 777

(51) Int. Cl.
*A22C 11/00* (2006.01)
(52) U.S. Cl. ............................................. 452/49
(58) Field of Classification Search ............ 452/21–26, 452/30–35, 46–48, 51; 53/285, 287, 476, 53/478, 480, 485, 417, 418; 99/494, 537, 99/538, 584
See application file for complete search history.

(56) References Cited

U.S. PATENT DOCUMENTS

| | | | |
|---|---|---|---|
| 2,709,255 A | 5/1955 | Frank | |
| 2,929,069 A | 3/1960 | Christin | |
| 3,224,083 A | 12/1965 | Tipper | |
| 3,919,739 A * | 11/1975 | Kawai | 452/31 |
| 4,044,425 A * | 8/1977 | Nausedas | 452/45 |
| 5,087,463 A * | 2/1992 | Raudys et al. | 426/138 |
| 5,573,454 A * | 11/1996 | Fox et al. | 452/29 |
| 5,816,903 A * | 10/1998 | Idziak | 452/49 |
| 6,045,445 A * | 4/2000 | Hummel et al. | 452/46 |
| 6,524,178 B1 | 2/2003 | Fassler et al. | |
| 6,659,855 B2 * | 12/2003 | Stimpfl | 452/49 |
| 6,871,474 B2 | 3/2005 | Topfer | |

FOREIGN PATENT DOCUMENTS

| | | |
|---|---|---|
| DE | 1 274 492 | 8/1968 |
| DE | 1 939 673 | 2/1971 |
| DE | 76 04 240 U | 6/1976 |
| DE | 27 25 359 | 12/1978 |
| DE | 195 19 591 | 12/1995 |
| GB | 1 453 331 | 10/1976 |

\* cited by examiner

*Primary Examiner*—Thomas Price
(74) *Attorney, Agent, or Firm*—Hahn Loeser & Parks LLP; Michael H. Minns

(57) ABSTRACT

A method of and an apparatus for controlled closure of at least one clip around a filling material-free plait portion of a casing between two filling material portions enclosed with the casing, comprising two closure tools that are to be controlledly moved and, in the closure operation, are to be arranged at both sides of the plait portion, where the two closure tools have a common guide device with which the closure tools are guided movably transversely with respect to the longitudinal extent of the plait portion, where to arrange the closure tools at the two sides of the plait portion one of the two closure tools is moved past the plait portion and is moved into a position of being aligned with the other closure tool for the closure operation.

10 Claims, 10 Drawing Sheets

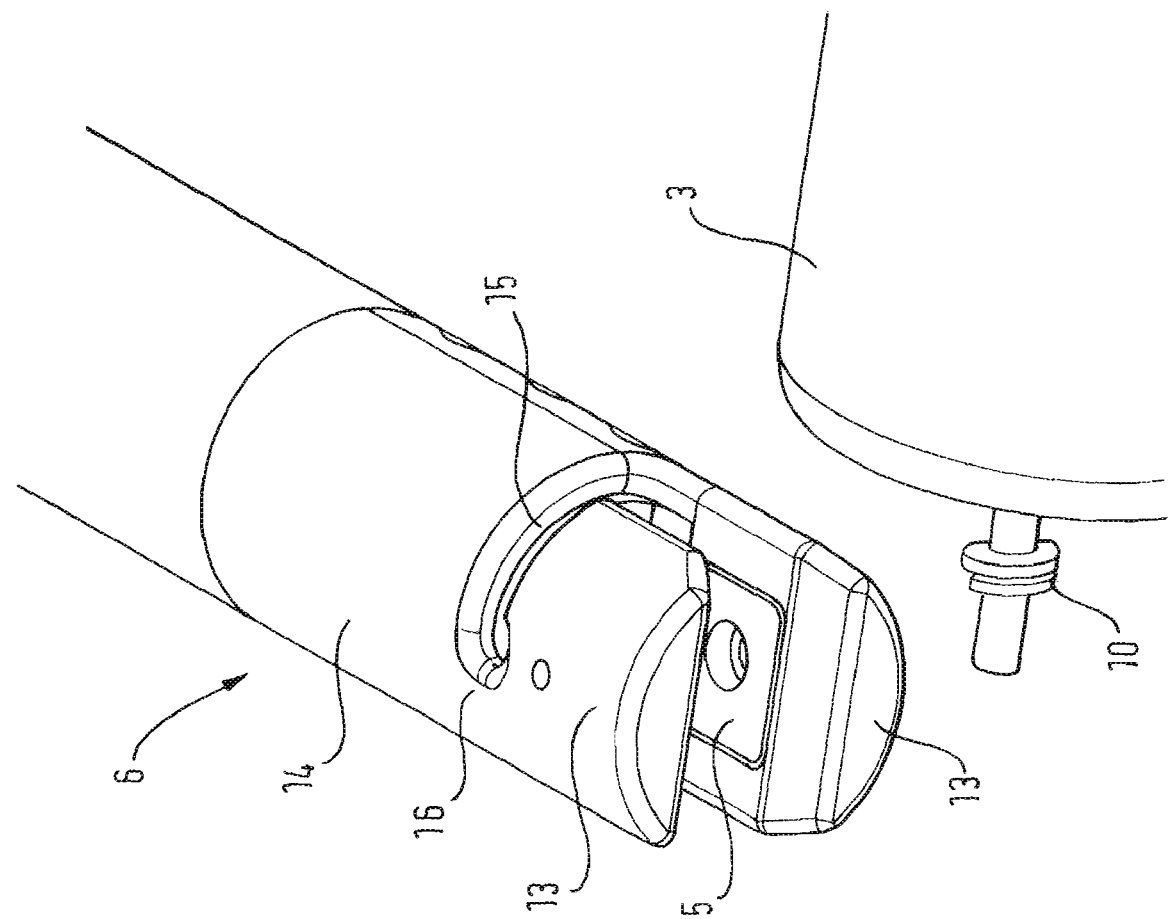
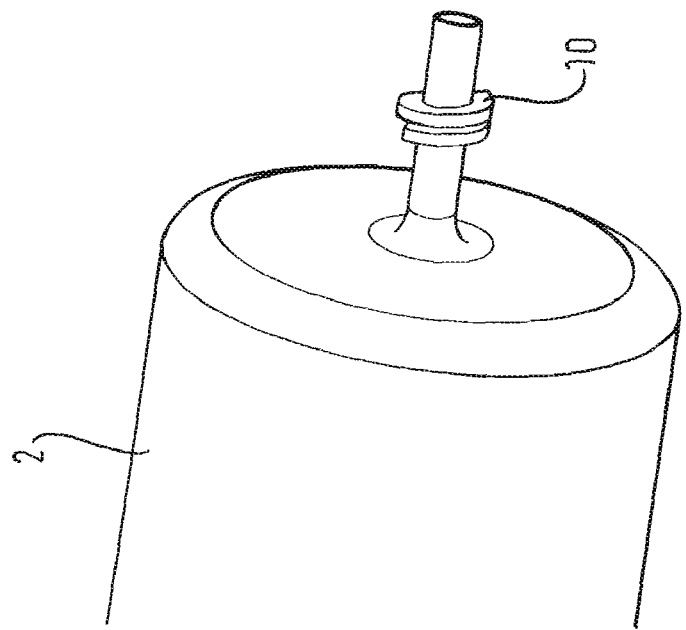
Fig. 5

METHOD OF AND APPARATUS FOR THE CONTROLLED CLOSURE OF AT LEAST ONE CLIP AROUND A FILLING MATERIAL-FREE PLAIT PORTION BETWEEN TWO FILLING MATERIAL PORTIONS ENCLOSED WITH A CASING

This patent application claims priority to German patent application DE 10 2007 012 777.6, filed Mar. 16, 2007, which is hereby incorporated herein by reference.

BACKGROUND OF THE INVENTION

The invention concerns a method of and an apparatus for the controlled closure of at least one clip around a filling material-free plait portion of a casing between two filling material portions enclosed with the casing, wherein the at least one clip in a condition of embracing the plait portion is closed around a plait portion by means of two controlledly moved closure tools.

An apparatus of that kind is known for example from DE 195 19 591 C2. In that publication a U-shaped clip is brought into contact with the filling material-free plait portion by two closure tools that are aligned relative to each other and the limbs of the clip are bent around the filling material-free plait portion in the closure movement in which one tool is moved towards the other.

EP 1 095 570 A1 (U.S. Pat. No. 6,524,178) discloses a double clipping apparatus in which two clips are closed around the filling material-free plait portion.

SUMMARY OF THE INVENTION

An object of the invention is to provide a method and an apparatus for the controlled closure of at least one clip around a filling material-free plait portion of a casing between two filling material portions enclosed with the casing, in which closure of the respective clip around the plait portion is achieved by means of a simple movement control, while involving a small amount of time.

The invention provides that one of the two closure tools is guided from one side of the plait portion transversely with respect to the longitudinal extent of the plait portion past the plait portion onto the other side of the plait portion. Then the two closure tools are moved into a mutually aligned position and then the operation of closing the clip around the plait portion is carried out.

In that case the closure tool that is moved past the plait portion can be moved with respect to the other closure tool, which is held stationary into the mutually aligned position. Preferably, for that purpose, the closure tool that is moved past the plait portion is moved into the position of being aligned with respect to the other closure tool for the closing operation by a rotary movement. In that case, the two closure tools are disposed at the two sides of the plait portion therebetween.

In that respect, in one embodiment, the rotary movement can take place about an axis of rotation perpendicular to the longitudinal extent of the plait portion. In a further embodiment, the rotary movement takes place about an axis of rotation that is parallel to the longitudinal extent of the plait portion. In the closing movement for closure of the clip, the two closure tools are moved towards each other, in which case that closing movement is preferably effected substantially perpendicularly to the longitudinal extent of the plait portion. Preferably, in that case, one of the two closure tools and in particular the closure tool that is moved past the plait portion is held in a stationary position and the other closure tool, which pushes the clip over the plait portion is moved. It will be appreciated that there is also the possibility of the closure tool that is moved past the plait portion being moved whereas the other closure tool is held in a stationary position.

Prior to the closing movement, the clip is moved into position between the two closure tools, where the clip is preferably arranged in front of the closure tool that is moved in the closing movement. The clip is preferably arranged between the two closure tools in a loading direction that is perpendicular to the direction of the closing movement.

Before the respective clip is moved individually into position between the two closure tools, a plurality of clips, arranged in a row, can be guided substantially parallel to the direction of the closing movement. The loading movement, which is perpendicular thereto, provides that successive clips can be easily moved individually respectively into the appropriate position for the closing movement between the closure tools.

When the one closure tool is moved past the plait portion, the two closure tools are guided at a given spacing relative to each other in the direction of the joint movement. That spacing guarantees that the clip can be disposed between the two tools and the plait portion comes to lie between the two closure tools. Preferably, prior to the joint movement of the two closure tools, the at least one clip is arranged in front of the closure tool that is moved in the closing operation. Arranging the clip in that way can preferably take place during production of the necked plait portion in which the packaging casing is constricted between two filling material portions by a displacement device. In addition, the two closure tools can also be moved synchronously with the flow of product and parallel to the flow of product, the direction of which is substantially perpendicular to the direction of the closing movement and in the direction of the longitudinal extent of the plait portion respectively.

Preferably, two clips are closed simultaneously around the plait portion. The clips to be closed are arranged between the two displacement devices (not shown), which serve to produce the filling material-free plait portion by constriction of the packaging casing, for the closing movement.

The apparatus for controlled closure of the at least one clip includes, for the two closure tools, a common guide device in the form of a clipping tool and with which the closure tools are guided transversely with respect to the longitudinal extent of the plait portion. One of the two closure tools is moved past the plait portion so that the closure tools are arranged at both sides of the plait portion. The guide device further ensures that the tool moved past the plait portion is aligned with the other closure tool for carrying out the closing movement. That movement into the aligned position is preferably a rotary movement, wherein, as already mentioned above, the rotary movement can take place about a rotary axis perpendicular to the plait portion or a rotary axis parallel to the plait portion.

The guide device or the clipping tool can preferably also be moved in the direction of the flow of product, at least during the closing movement in which the respective clip is closed around the plait portion.

The guide device can be of a simple design configuration and can preferably be in bar form, in particular in the form of a cylindrical and in particular circular-cylindrical bar. In that respect, only the part of the guide device, that is required for the closure operation can be arranged and moved in front of a separating wall. The other parts are disposed behind the separating wall. Preferably, the invention is used for filling the casing with foodstuffs, in particular in sausage manufacture.

The bar-form configuration of the guide device or the clipping tool ensures that the arrangement is low in weight and of compact dimensions. This clipping tool, which in particular is of a cylindrical configuration, can thus be moved quickly. The clipping tool disposed in a bar-shaped housing can also be easily cleaned. Simple clip monitoring, in particular checking results, and appropriate reactions, are also possible. Each movement, in particular the closing movement can be adapted to the respective product to be handled. The forces to be applied and the distances to be covered in the movement, when closing the respective clip, can be easily controlled. The overall arrangement of the apparatus is insensitive in relation to tolerances in respect of material and manufacture.

Furthermore it is particularly advantageous with the present invention that the operation of cutting through the plait portion occurs after closure of the at least one clip by a severing blade driven by an electric motor, preferably a linear motor. That eliminates the need to provide any compressed air installations, as is the case in the state of the art.

In order to be able to process clips of different sizes with the apparatus according to the invention or with the clip pincer according to the invention, it is further advantageous if the pincer head is interchangeable. In particular, the portion of the clipping tool according to the invention or the clip pincer according to the invention, which includes the at least one female die and the at least one ram, can be adapted to be interchangeable. The various pincer heads differ from each other in that respect in terms of the rams and/or dies that are adapted to the different clip sizes. It is likewise possible for parts of the clip loading device, in particular the clip thrust tray, to be interchangeable. Furthermore however it is also possible for those parts to be so designed that it is possible for them to be used for dealing with a plurality of clips of different sizes.

Furthermore, the rotary movement is provided to be performed about a rotary axis parallel or perpendicular to the longitudinal extent of the plait portion.

It is advantageous that the two closure tools are moved towards each other in the closure movement for closing the clip.

Another advantage is that in the closure operation the closure tool that is moved past the plait portion is held stationary and the other closure tool is moved towards the stationarily held closure tool.

Preferably, in the movement of the one closure tool past the plait portion both closure tools are guided jointly at a spacing relative to each other in the common direction of movement.

It should be noted that prior to the joint movement guidance of the two closure tools the at least one clip is arranged in front of the tool that is moved in the closure operation.

It should also be noted that the clip is arranged between the closure tools during production of the plait portion.

Furthermore, two clips are closed around the plait portion.

It is advantageous that the closure tool that is moved past the plait portion is movable by a rotary movement into the position of alignment with the other closure tool.

Another advantage is that the rotary movement takes place about a rotary axis perpendicular to the longitudinal extent of the plait portion or a rotary axis parallel to the plait portion.

It should be noted that the clips are fed in a clip feed device to a clip separating device in the clip loading device.

An additional advantage is that a plurality of clips are guided in a row in the clip feed device and are moved individually out of the clip feed device into a clip lifting device moved perpendicularly thereto.

It should be noted that the directions of movement of the clips in the clip feed device and the clip lifting device extend substantially perpendicularly to each other.

It is advantageous that the direction of movement of the respective clip in the clip lifting device is substantially perpendicular to the closing movement of the closure tool.

Furthermore, it should be noted that a severing blade for severing the plait portion after closure of the at least one clip is further guided in the guide device.

It is provided that the direction of movement of the severing blade extends parallel to the closing movement of the one closure tool.

It is also provided that the guide device is of a bar-shaped configuration and the closure tool which can be moved past the plait portion is arranged at the front end of the bar of the guide device.

Another advantage is that the guide device is formed by a clipping tool which, at the front end, has a guide portion that is rotatable about the rotary axis extending perpendicularly to the plait portion and is fixed to the at least one closure tool that can be moved past the plait portion.

It should also be noted that the at least one closure tool is held in a tool jaw on the rotatable guide portion, where provided between the tool jaw and the remaining part of the rotatable guide portion is a slot that permits the rotary movement about the rotary axis and extends around the rotary axis.

It is provided that the rotary movement around the rotary axis that is perpendicular to the plait portion takes place within an angular range of about 90°.

It is also provided that the rotatable guide portion is of a substantially hollow-cylindrical form, the outside dimension of which is adapted to the housing shape of the clipping tool.

BRIEF DESCRIPTION OF THE DRAWING FIGURES

The invention will be described in greater detail hereinafter by means of embodiments by way of example with reference to the Figures in which.

Figure 4:
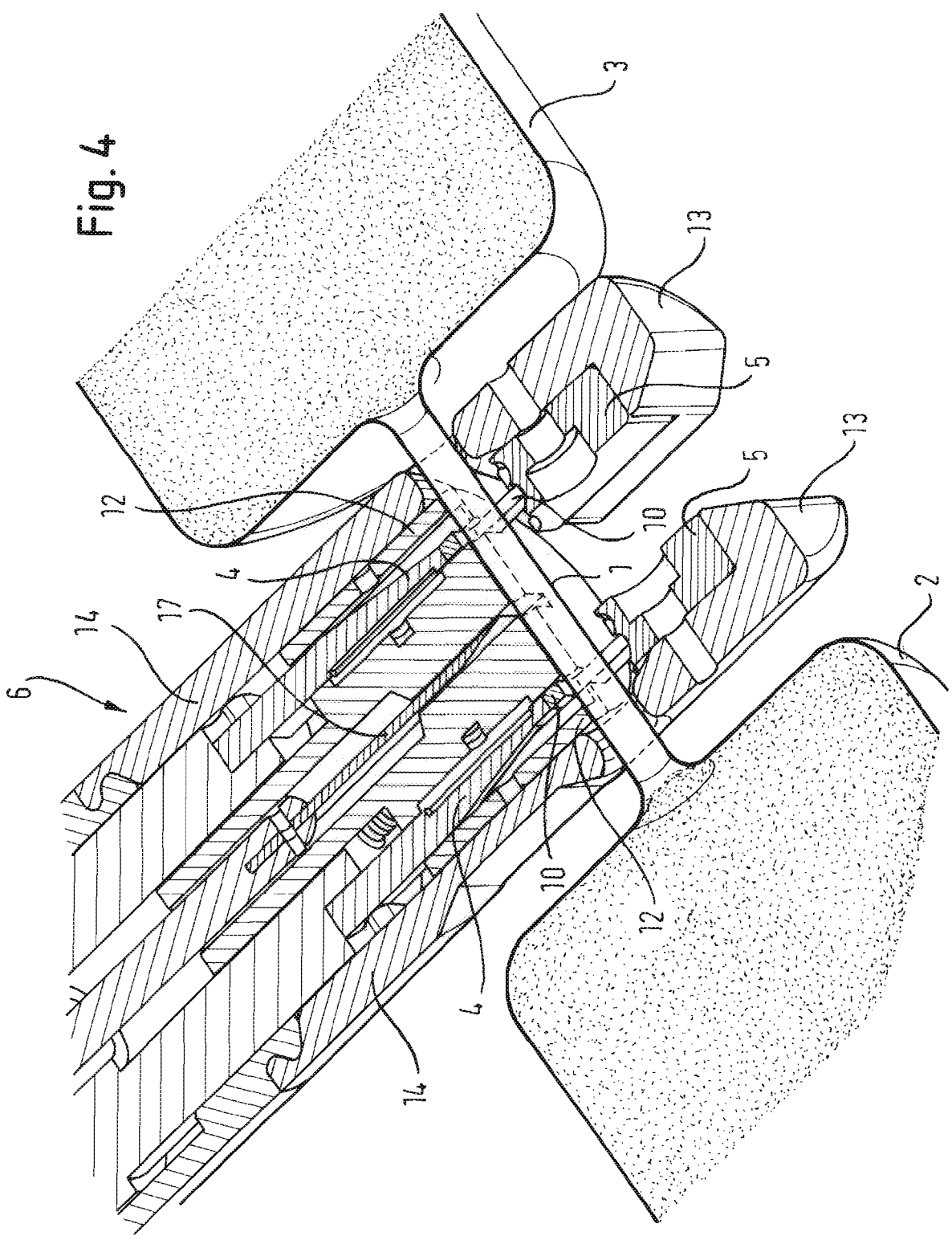
Figure 6:
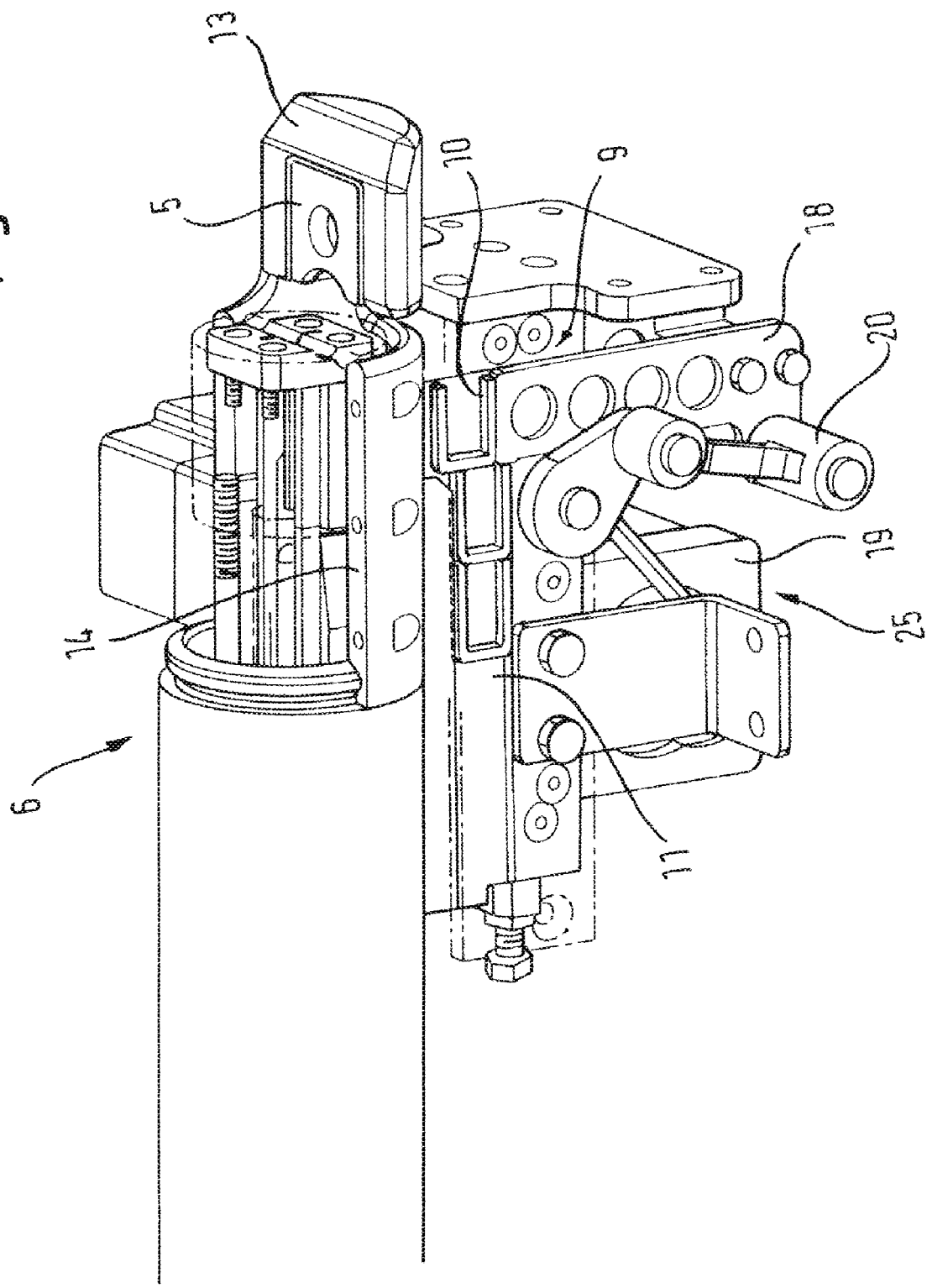
Figure 7:
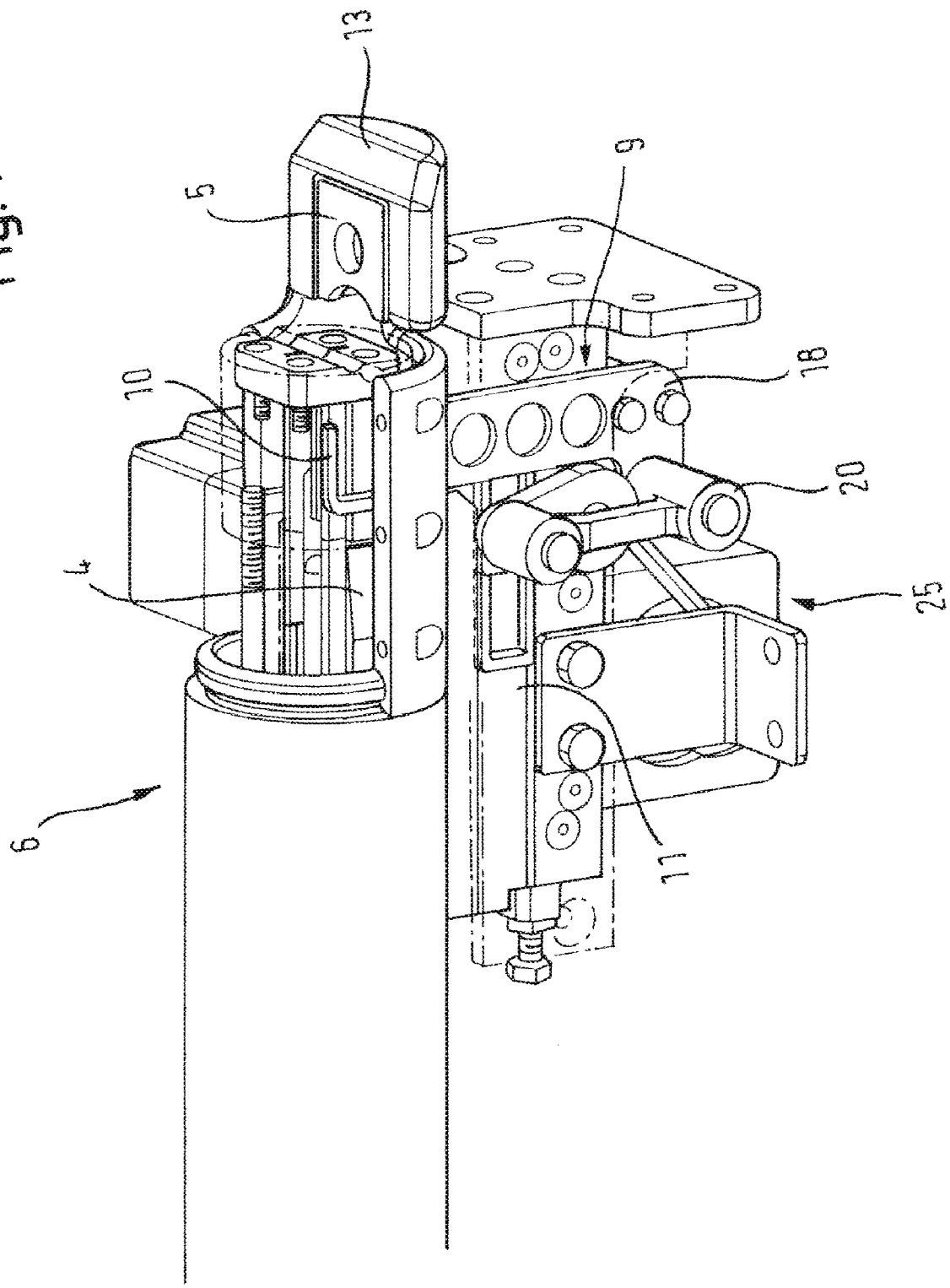
Figure 8:
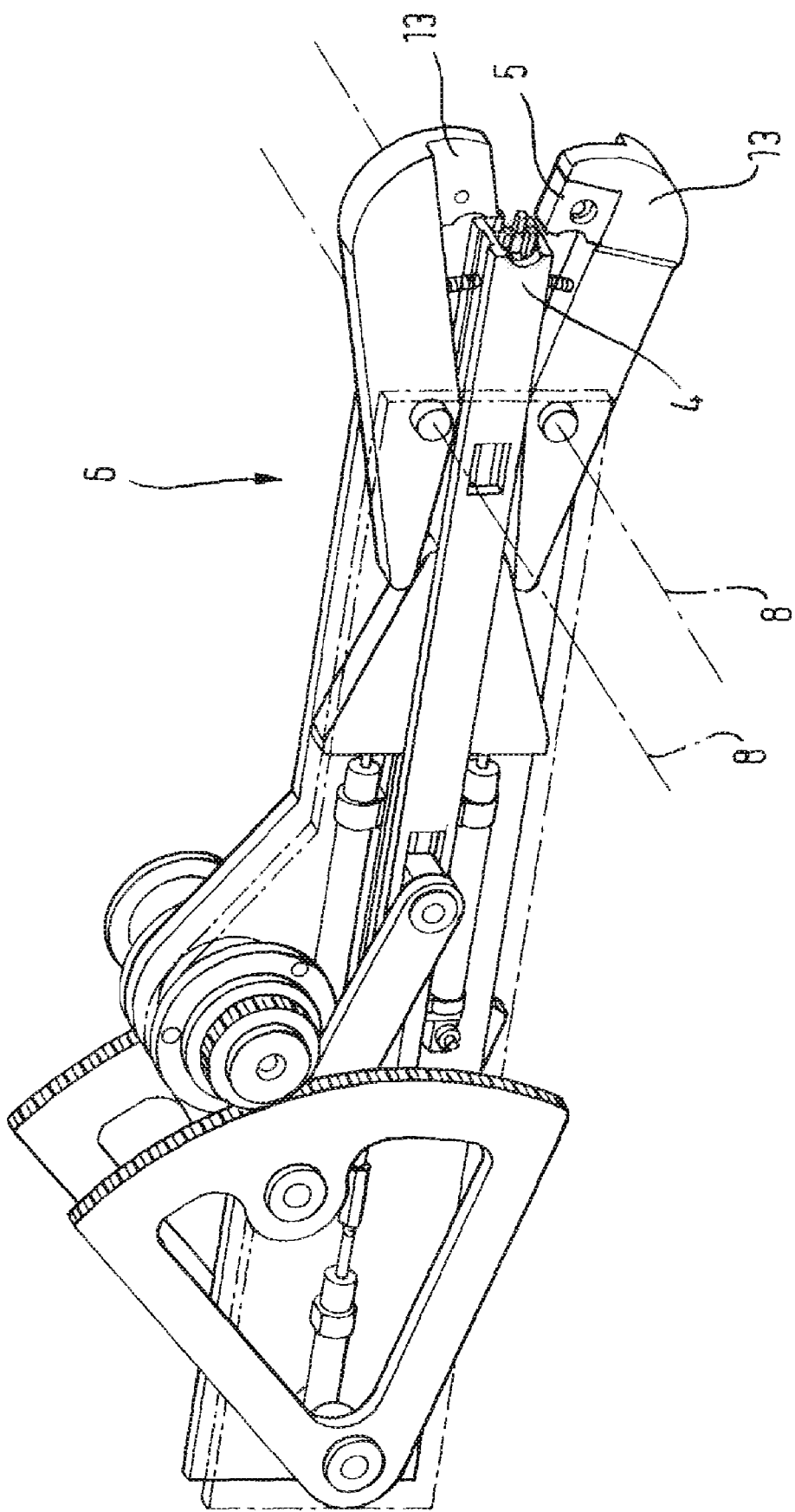
Figure 9:
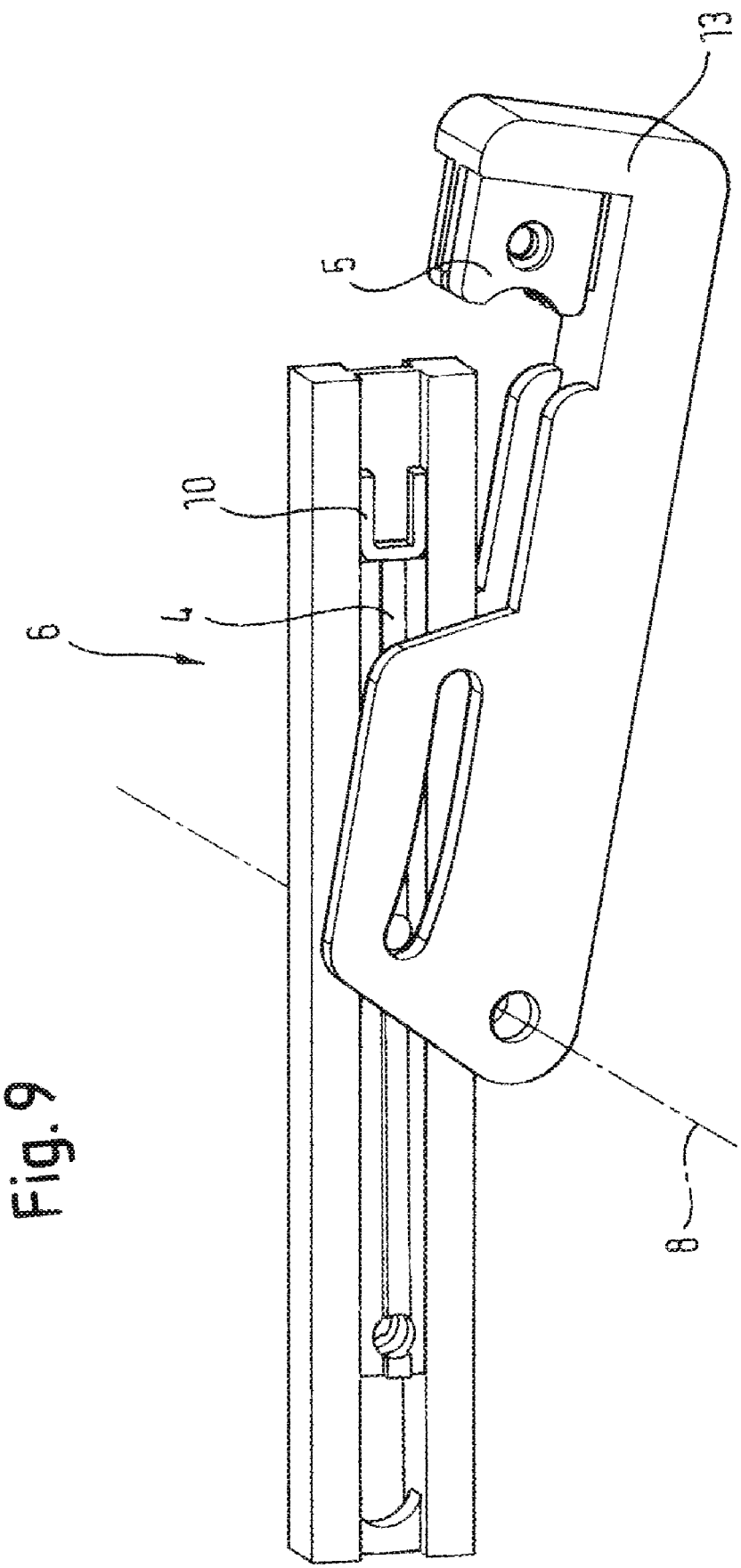
Figure 10:
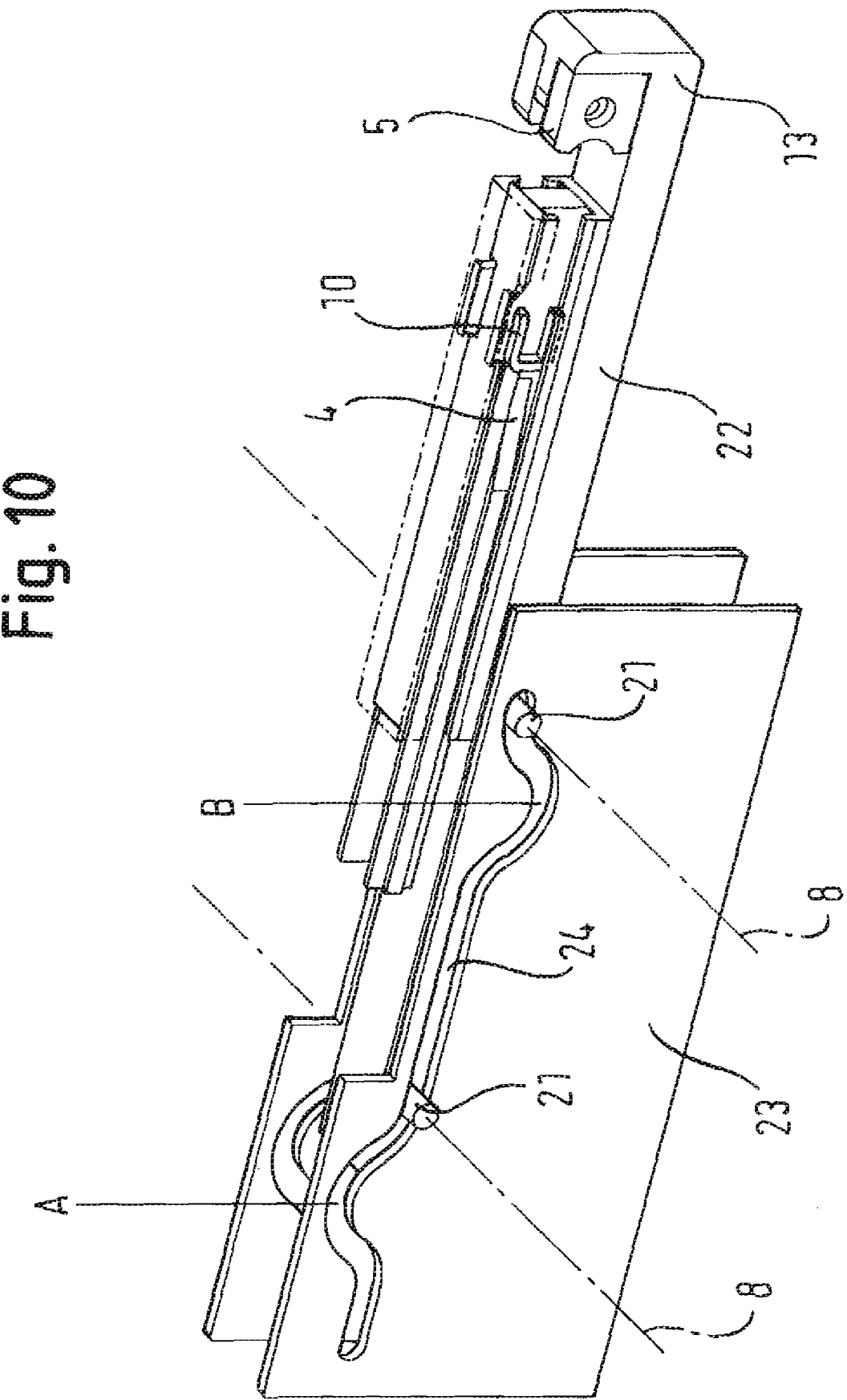

FIG. 4 shows a view in section of the first embodiment in the third operating position, FIG. 5 shows the first embodiment in a fourth operating position, FIG. 6 shows the first embodiment in co-operating with a clip loading station in a first feed operating position, FIG. 7 shows the embodiment shown in FIG. 6 in a second clip feed position, FIG. 8 shows a perspective side view of a second embodiment, FIG. 9 shows a third embodiment, and FIG. 10 shows a fourth embodiment.

DETAILED DESCRIPTION

The embodiments illustrated in the Figures show apparatuses or clipping tools 6 for the closure of at least one clip 10 around a filling material-free necked plait portion 1 of a casing between two filling material portions 2, 3 enclosed with the casing. The filling material can be foods, in particular sausage foods.

The illustrated clipping tools 6 include closure tools 4, 5, with which the respective clip 10 is arranged and closed around the plait portion 1 in the closure operation. The closure tools 4, 5 can be in the form of a ram (closure tool 4) and a die (closure tool 5).

The two closure tools 4, 5 are arranged in a common guide device that is formed by the clipping tool 6 and has a housing, preferably a circular-cylindrical housing in the embodiment of FIGS. 1 through 7. The embodiments of the clipping tools 6, shown in the Figures, are of an elongate form, in particular of a bar form.

The following operating procedure is carried out to close a respective clip 10 around the plait portion 1.

Displacement devices (not shown), which move synchronously with the flow of product formed by the filling material portions 2, 3, produce the substantially filling material-free constricted plait portion 1 in known manner by displacement and spreading. Those two displacement devices are disposed at the two ends of the plait portion 1. During the operation of filling the casing and during production of the plait portion 1 by the displacement devices, the clipping tool 6 is loaded with a clip or two clips 10, as will be described in greater detail hereinafter with reference to FIGS. 6 and 7.

Figure 1:
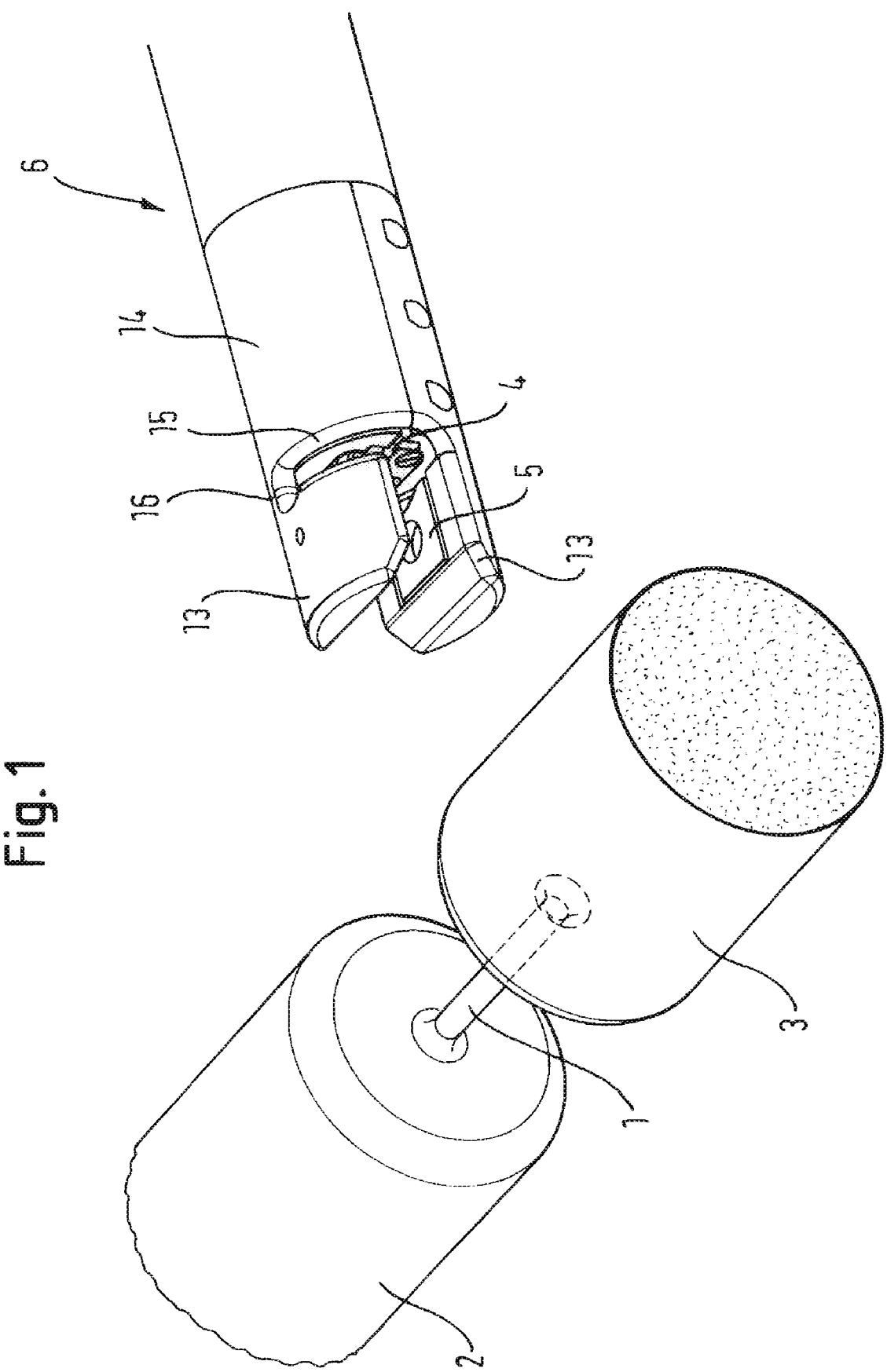
FIG. 1 shows a first embodiment in a first operating position.
Figure 2:
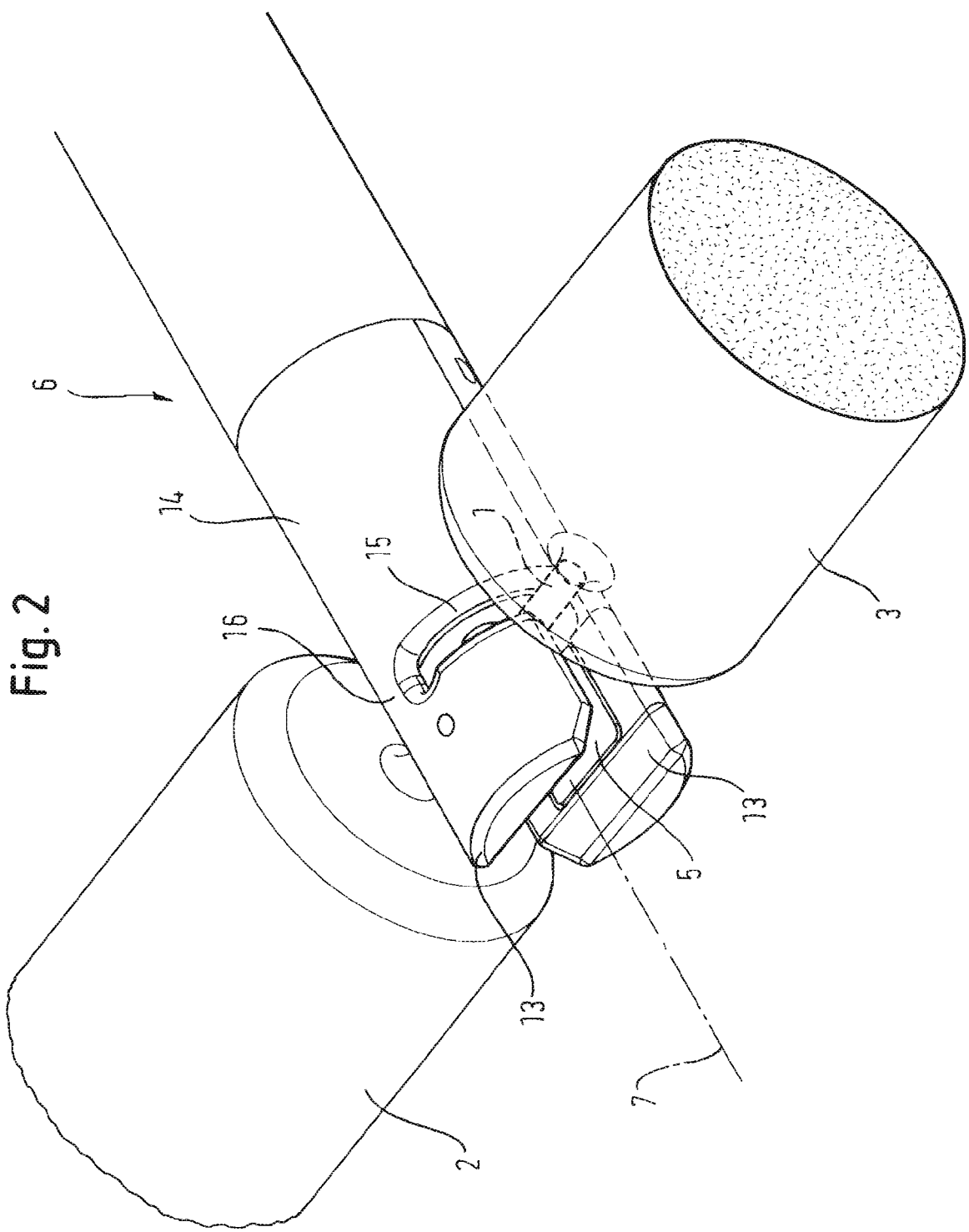
FIG. 2 shows the first embodiment in a second operating position.

At the beginning of the closure operation, the clipping tool 6, which is loaded with the clips 10 and also forms the joint guide device for the closure tools 4, 5, is moved out of the retracted starting position shown in FIG. 1, substantially perpendicularly to the extent of the plait portion 1, until the closure tool 5 or the two closure tools 5 are moved past the plait portion 1 onto the other side of the plait portion. In the illustrated embodiments, the closure tools 5 that are moved past the plait portion are held in tool jaws 13. As can be seen from FIG. 2, those tool jaws 13 are moved together with the closure tools 5 from the position in FIG. 1 onto the other side of the plait portion 1. The closure tools 4 remain at the starting side. That means that the closure tools 4 and 5 respectively required for the closure operation are disposed at both sides of the plait portion 1.

In order to move the closure tools 4 and 5 into a respective mutually aligned position for the subsequent closure operation, in the embodiment of FIGS. 1 through 7, the closure tools 5 are respectively rotated or pivoted about a rotary axis 7 perpendicular to the plait portion 1 while in the embodiments of FIGS. 8 through 10 they are respectively pivoted or rotated about a rotary axis 8 which is parallel to the plait portion 1 which is not shown in those Figures.

Figure 3:
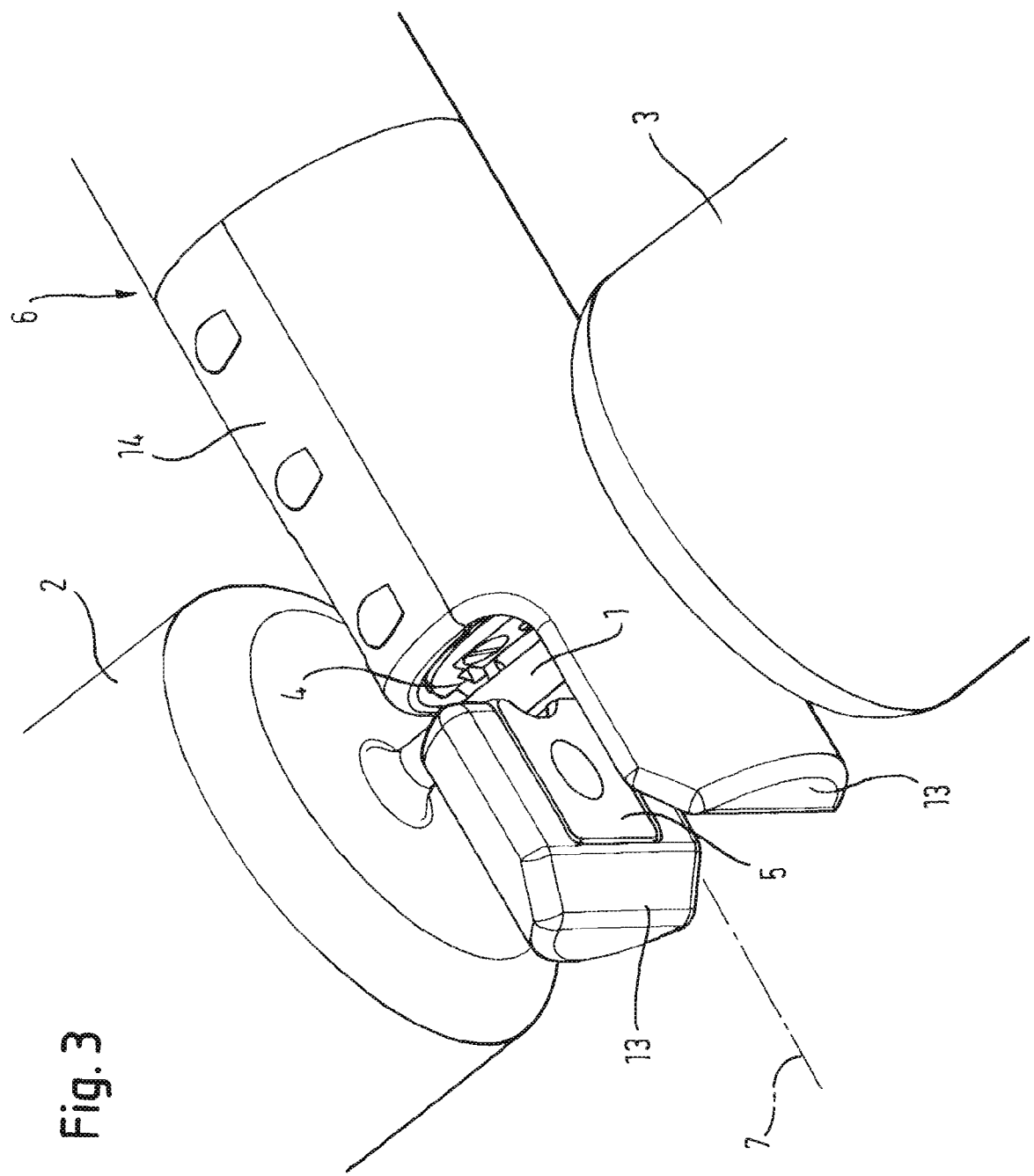
FIG. 3 shows the first embodiment in a third operating position.

In the embodiment of FIGS. 1 through 7, after the pivotal movement about the rotary axis 7, the closure tools 5 on the two tool jaws 13 assume the position shown in FIGS. 3 and 4. For that purpose, at the front end, the guide device forming the clipping tool 6 has a rotatable guide portion 14 to which the tool jaws 13 are fixed. That rotatable guide portion 14 is adapted to the cylindrical shape of the rest of the housing and is of a substantially hollow-cylindrical configuration. In the advance movement of the closure tools 5 (FIG. 2) held in the tool jaws 13, they are disposed above and below a plane in which the plait portion 1 is disposed. The tool jaws 13 and the closure tools 5 held therein are spaced from each other, which permits the unimpeded forward thrust movement of the closure tools 5 past the plait portion 1 in the movement from the position shown in FIG. 1 into the position shown in FIG. 2. In order to permit the rotational movement of the closure tools 5 from the position shown in FIG. 2 into the position shown in FIGS. 3 and 4 about the rotary axis 7, are slots 15 extending approximately over an angular range of 90° provided between the tool jaws 13 and the closure tools 5 held therein and the remaining part of the rotatable guide portion 14. The slot width is such that the edges of the slots can be moved unimpededly past the plait portion 1 in the rotary movement. That permits a rotary movement from the position shown in FIG. 2 into the position of the closure tools, shown in FIGS. 3 and 4. That rotational movement takes place over an angle of about 90°.

The tool jaws 13 in the illustrated embodiment are integrally connected to the remaining part of the rotatable guide portion 14 by connecting legs 16. The rotatable guide portion can be of a hollow-cylindrical configuration for adaptation to the housing of the common guide device 6 or the clipping tool.

As can be seen in particular from FIG. 4, the closure tools 4 and 5 are aligned relative to each other for the subsequent closure operation, in which case the plait portion 1 and the clips 10 pushed with their limbs over the plait portion 1 are disposed between the closure tools.

A fixing device 12, which for example can be of a sleeve-shaped configuration, can be provided in the clipping tool 6 for proper positioning, in particular centrally, with respect to the closure tools 4 and 5.

To close the two clips 10, the closure tools 4, which can be in the form of rams, are moved in a direction towards the closure tools 5, which can be in the form of dies. In that case the clips 10 are pushed forwardly against the closure tools 5 and the limbs of the clips 10, which are pushed over the plait portion 1, are looped around the plait portion 1 by the die surfaces on the closure tools 5, and are closed. That closure operation can be controlled on the basis of distance covered and/or controlled on the basis of the force involved, and can be carried out with monitoring of the closure force and/or the clip height.

After that closure operation, the closure tools 4 move back into their starting position and release the severed plait portions. The rotatable guide portion 14 is rotated back into the position shown in FIG. 2, together with the closure tools 5. The guide device or the clipping tool 6 is then moved back out of that position into the starting position that is shown in FIG. 5 and which corresponds to the position shown in FIG. 1. If no severing of the filling material-free plait portion 1 has occurred, the closure tools 5 can be moved unimpededly past the plait portion 1, by virtue of the spacing. If, as described above, the plait portion 1 has been cut into two portions by means of the severing blade 17, the situation that results is the operating situation shown in FIG. 5. With the clipping tool 6 in that position, re-loading with the clips 10 takes place. That procedure will be described with reference to FIGS. 6 and 7.

A clip loading device 25, which is arranged beneath the clipping tool 6 in the starting position, serves for loading the clipping tool 6. In a clip feed device 11, the clips are moved in a row in parallel with the longitudinal extent of the clipping tool 6 into a separation station for separating the clips into individual clips, the separating station in the illustrated embodiment being in the form of a clip lifting device 9. The clip lifting device 9 includes a lifting element 18 that is driven by a drive device 19 by way of a crank transmission 20. The clip that leads in the row of clips is engaged by the lifting element 18 and moved into a position in front of the closure tool 4 (FIG. 7). The conveyor movement or lifting movement of the lifting element 18 is perpendicular to the conveyor direction of the clips, which are fed in a row to the lifting element 18, in the clip feed device 11. It will be apparent from the foregoing description that the clips 10 are respectively supplied individually for loading the clipping tool 6. For that purpose, a plurality of clips 10 are supplied in a row in a given direction, in particular parallel to the longitudinal extent of the clipping tool 6, and transferred into a second direction of movement perpendicularly thereto for loading the clipping tool 6 with the individual clips. The clips are separated into individual clips at the change in the direction of movement.

In the embodiments of FIGS. 8 through 10, the closure tools 5, which are preferably in the form of dies, are fixed to tool jaws 13, which are pivotable about the rotary axes 8. The respective rotary axes 8 extend parallel to the plait portion 1. The clipping tools 6 shown in these embodiments, as in the embodiment of FIG. 1, also form a common guide device for the closure tools 4 and 5 when the closure tools 5 move past the plait portion 1 so that they are moved into a position corresponding to FIG. 2. In the embodiment of FIG. 8, in that movement past the plait portion, the two tool jaws 13 are in the illustrated opened position. In the embodiment of FIG. 9, the tool jaw 13 is in the downwardly pivoted position shown in the FIG. In the embodiment of FIG. 10, the tool jaw is also in a downwardly pivoted movement as shown in FIG. 9, in its movement past the plait portion 1. That is achieved in that guide projections 21, which are provided on a guide arm 22 rigidly connected to the tool jaw 13, are respectively disposed in the central positions at A and B of the curved parts of a guide slot 24 in a guide plate 23. In the illustrated embodiment, corresponding guide plates 23 are provided on both sides of the guide arm 22. The pivotal movement is defined by a combined movement which the guide projections 21 perform in the guide slot 24, in particular in the two curved slot regions. The tool jaws 13 with the closure tools 5 fixed thereto are then pivoted about the respective rotary axes 8 from the position corresponding to FIG. 2, so that they are aligned with the closure tools 4. That position corresponds to the position of the first embodiment, as illustrated in FIGS. 3 and 4. As shown in relation to the embodiment of FIG. 8, that pivotal movement is produced by a drive and a transmission that is arranged between the tool jaws 13 and converts the drive movement into corresponding pivotal movements. The closure tools 4, in front of which the clips are arranged, are then moved towards the closure tools 5 in order to close the two clips around the plait portion 1, as described with reference to FIG. 4 in connection with the first embodiment. The respective clipping tool 6 is then moved back into the starting position.

Advantageously, the front part of the clipping tool, that is required for closing the clips, can project through a separating wall. That provides for simplified cleaning of the part of the clipping tool 6 that is in the working region, in particular in the wet region. The other associated parts that serve for controlling the movement of the clipping tool as well as the clip loading station and other motion-control devices are disposed behind the separating wall.

In order to permit the clipping tool 6 to also move with the flow of product, the separating wall can have therein a slot that extends parallel to the direction of movement of the flow of product and in which the clipping tool can be moved synchronously with the flow of product. That movement takes place approximately in the direction of the longitudinal extent of the plait portion 1.

The invention claimed is:

1. A method of controlled closure of at least one clip around a filling material-free plait portion of a casing between two filling material portions enclosed with the casing, the method comprising the steps:

providing two controlledly moved closure tools;

moving one closure tool from one side of the plait portion transversely with respect to the longitudinal extent of the plait portion past the plait portion onto the other side of the plait portion;

moving the two closure tools into a mutually aligned position for subsequent closure of the clip around the plait portion;

closing the at least one clip in a condition of embracing the plait portion around a plait portion by operating the two closure tools.

2. The method of claim 1 where the step of moving one closure tool from one side of the plait portion transversely with respect to the longitudinal extent of the plait portion past the plait portion onto the other side of the plait portion further comprises holding the other closure tool stationary.

3. The method of claim 1 where the step of moving one closure tool from one side of the plait portion transversely with respect to the longitudinal extent of the plait portion past the plait portion onto the other side of the plait portion further comprises rotationally moving the one closure tool.

4. The method of claim 1 further comprising the step of moving the clip between the closure tools in a loading direction perpendicular to the direction of the closure movement.

5. The method of claim 4 where the step of moving the clip comprises positioning the clip in front of the closure tool which is moved in the closure operation.

6. The method of claim 4 where prior to the step of moving the clip, guiding a plurality of clips substantially perpendicularly to the direction of the loading movement.

7. An apparatus for the controlled closure of at least one clip around a filling material-free plait portion of a casing between two filling material portions which are enclosed within the casing, the apparatus comprising:

two closure tools configured to be controlledly moved, the two closure tools being positioned at both sides of the plait portion with the plait portion between the two closure tools when the closure tools are in a closure position;

a common guide device operatively connected with the closure tools, the common guide device being movably transversely with respect to the longitudinal extent of the plait portion, the common guide device being movable between two positions, a first position where one of the two closure tools is moved past the plait portion and a second position where said one of the two closure tools is moved into a position of being aligned with the other closure tool for a closure operation.

8. The apparatus of claim 7 where, when the guide device is in second position, the said one of the two closure tools is held stationary in the guide device while the other closure tool is moved in the guide device.

9. The apparatus of claim 7 further comprising:

a clip loading device to position a respective clip into a readiness position for the closure operation.

10. The apparatus of claim 7 where the guide device has a fixing device guided parallel to the closing movement and the plait portion is fixable relative to the guide device.

* * * * *